(12) United States Patent
Monaco et al.

(10) Patent No.: US 10,924,502 B2
(45) Date of Patent: Feb. 16, 2021

(54) NETWORK SECURITY USING INFLATED FILES FOR ANOMALY DETECTION

(71) Applicant: NOBLIS, INC., Falls Church, VA (US)

(72) Inventors: Matthew K. Monaco, Falls Church, VA (US); Daniel Negron, Falls Church, VA (US); Brian Satira, Falls Church, VA (US); Michael Collins, Falls Church, VA (US)

(73) Assignee: NOBLIS, INC., Reston, VA (US)

( * ) Notice: Subject to any disclaimer, the term of this patent is extended or adjusted under 35 U.S.C. 154(b) by 162 days.

(21) Appl. No.: 15/394,486

(22) Filed: Dec. 29, 2016

(65) Prior Publication Data

US 2018/0191755 A1 Jul. 5, 2018

(51) Int. Cl.
*G06F 21/55* (2013.01)
*H04L 29/06* (2006.01)

(52) U.S. Cl.
CPC ........ *H04L 63/1425* (2013.01); *G06F 21/552* (2013.01); *H04L 63/1491* (2013.01)

(58) Field of Classification Search
CPC ............. H04L 63/1425; H04L 63/1491; G06F 21/552; G06F 21/6218
See application file for complete search history.

(56) References Cited

U.S. PATENT DOCUMENTS

| | | | |
|---|---|---|---|
| 7,765,369 B1 * | 7/2010 | Prahlad | G06F 3/0608 711/159 |
| 8,549,643 B1 * | 10/2013 | Shou | G06F 21/556 726/23 |
| 9,009,829 B2 * | 4/2015 | Stolfo | G06F 21/554 726/23 |
| 9,591,023 B1 * | 3/2017 | McClintock | G06F 21/6245 |
| 9,641,544 B1 * | 5/2017 | Treat | H04L 63/02 |
| 9,705,920 B1 * | 7/2017 | Ramalingam | H04L 63/20 |
| 10,133,820 B2 * | 11/2018 | Tsaur | G06F 16/951 |
| 2013/0091539 A1 * | 4/2013 | Khurana | H04L 63/1425 726/1 |
| 2016/0335432 A1 * | 11/2016 | Vatamanu | G06N 20/00 |
| 2017/0134405 A1 * | 5/2017 | Ahmadzadeh | H04L 63/1433 |

* cited by examiner

*Primary Examiner* — Daniel B Potratz
*Assistant Examiner* — D'Arcy Winston Straub
(74) *Attorney, Agent, or Firm* — Morrison & Foerster LLP (57) ABSTRACT

Techniques for providing network security and anomaly detection are disclosed. In some embodiments, network traffic may be monitored in order to create a model of network traffic over a first period of time. Based on the model of network traffic, one or more inflated files may be created and stored on a system, wherein the inflated files are of a sufficient file size such that attempts to exfiltrate one or more of the files may be detected based by network monitoring tools. The inflated files may further include one or more indicators of sensitivity, including indicators of the presence of sensitive information that is not actually included in the inflated files. Network traffic characteristics may then be repeatedly or continuously monitored in order to update the size of the one or more inflated files based on changes in network traffic characteristics.

19 Claims, 4 Drawing Sheets

NETWORK SECURITY USING INFLATED FILES FOR ANOMALY DETECTION

The present disclosure relates generally to network security and, more specifically, to anomaly detection.

BACKGROUND

In network security, anomaly detection and data loss prevention present areas of need for network administrators. While anomaly detection tools may be used to detect attempts to exfiltrate data from a network, many known anomaly detection tools result in false-positive alert rates that are too high. Even when false-positive alert rates are less than one percent, large and active networks may still generate dozens or hundreds of false-positive anomaly detection alerts per day, and network administrators may be overwhelmed by the task of assessing every alert. Overwhelmed network administrators may accordingly opt not to use any known anomaly detection tools, and the risk of data exfiltration going undetected may be increased.

Furthermore, exfiltration detection methods that watch for sensitive terms or known sensitive data being exfiltrated may be circumvented when malicious actors encrypt data before exfiltrating it. Exfiltration detection methods that watch for malware signatures may be circumvented by malicious actors who randomize malware or who simply use common tools that are not malware. Exfiltration detection methods that aggressively monitor transfer channels (e.g., HTTP) may be circumvented by malicious actors who move exfiltration to other channels such as less obvious protocols (e.g., UDP). Even exfiltration detection methods that leverage anomaly detection may be circumvented when the methods only look for traffic spikes at certain times or specific to certain hosts, as malicious actors may simply spread out exfiltration over extended periods of time and/or over multiple targets. Accordingly, there is a need for improved anomaly detection techniques that reliably detect exfiltration attempts while minimizing false-positive alerts.

Thus, there is a need for improved systems, methods, and techniques of providing network security, anomaly detection, and data loss prevention.

BRIEF SUMMARY

As described above, there is a need for improved systems, methods, and techniques of providing network security, anomaly detection, data exfiltration prevention, and data loss prevention.

Particularly, there is a need for improved anomaly detection techniques that reliably detect exfiltration attempts while minimizing false-positive alerts. Described herein are techniques for providing improved anomaly detection by iteratively updating a model of network traffic and using the iteratively updated model to (a) compare to monitored network traffic for increases in activity and to (b) create inflated files (e.g., "honey files") that are inflated with arbitrary or random and obfuscated data, such that malicious actors attempting to exfiltrate data will be more likely to trigger anomaly detection alerts due to the large but obscured size of inflated files.

Described herein are methods, systems, and techniques for providing network security, anomaly detection, and data loss prevention.

In some embodiments, a computer system for creating a file for data exfiltration detection is provided, the system comprising: one or more processors; and memory storing one or more programs configured to be executed by the one or more processors, the one or more programs including instructions for: determining a data size for a file in accordance with one or more characteristics of traffic of a computer network associated with the system; and storing a file having the determined data size on a storage medium of the system, wherein the file comprises one or more indicators that the file includes sensitive data that is not included in the file.

In some embodiments of the computer system, the one or more characteristics of the traffic are characteristics monitored over a first period of time.

In some embodiments of the computer system, determining the data size comprises: transmitting, to a remote computer, first network traffic data corresponding to the one or more characteristics of the traffic over a first time period; and receiving, from the remote computer, one or more parameters calculated in accordance with the first network traffic data, wherein the one or more parameters indicate the data size.

In some embodiments of the computer system, storing the file having the determined data size comprises storing inflation data in the file, wherein: an amount of inflation data is determined in accordance with one or more parameters; and the inflation data is randomly generated or pseudo-randomly generated data.

In some embodiments of the computer system, storing inflation data in the file comprises removing reference to the inflation data from an index of the file.

In some embodiments of the computer system, storing the file comprises modifying a legitimate file to remove the sensitive data.

In some embodiments of the computer system, storing the file comprises algorithmically generating a file based on portions of one or more legitimate files.

In some embodiments of the computer system, the sensitive data comprises one or more selected from the group of: usernames, passwords, personal user information, encryption keys, medical information, and financial information.

In some embodiments of the computer system, the one or more indicators comprise content generated based on the content of genuine documents related to a subject matter of other documents stored on the storage medium.

In some embodiments of the computer system, the data size is determined based on the one or more characteristics of network traffic such that exfiltrating a file of the data size will generate an alert via a network monitoring tool.

In some embodiments of the computer system, the one or more programs including instructions for determining, based on second network traffic data corresponding to one or more characteristics of traffic of the network over a second time period, that the file has been exfiltrated from the network.

In some embodiments of the computer system, the one or more characteristics of traffic of the network over a second time period comprise one or more of: a throughput characteristic, a flow characteristic, and a deep packet inspection characteristic.

In some embodiments, a method for creating a file for data exfiltration detection is provided, the method performed at a computer system comprising one or more processors and memory, the method comprising: determining a data size for a file in accordance with one or more characteristics of traffic of a computer network associated with the system; and storing a file having the determined data size on a storage medium of the system, wherein the file comprises one or more indicators that the file includes sensitive data that is not included in the file.

In some embodiments of the method, the one or more characteristics of the traffic are characteristics monitored over a first period of time.

In some embodiments of the method, determining the data size comprises: transmitting, to a remote computer, first network traffic data corresponding to the one or more characteristics of the traffic over a first time period; and receiving, from the remote computer, one or more parameters calculated in accordance with the first network traffic data, wherein the one or more parameters indicate the data size.

In some embodiments of the method, storing the file having the determined data size comprises storing inflation data in the file, wherein: an amount of inflation data is determined in accordance with one or more parameters; and the inflation data is randomly generated or pseudo-randomly generated data.

In some embodiments of the method, storing inflation data in the file comprises removing reference to the inflation data from an index of the file.

In some embodiments of the method, storing the file comprises modifying a legitimate file to remove the sensitive data.

In some embodiments of the method, storing the file comprises algorithmically generating a file based on portions of one or more legitimate files.

In some embodiments of the method, the sensitive data comprises one or more selected from the group of: usernames, passwords, personal user information, encryption keys, medical information, and financial information.

In some embodiments of the method, the one or more indicators comprise content generated based on the content of genuine documents related to a subject matter of other documents stored on the storage medium.

In some embodiments of the method, the data size is determined based on the one or more characteristics of network traffic such that exfiltrating a file of the data size will generate an alert via a network monitoring tool.

In some embodiments of the method, the method comprises determining, based on second network traffic data corresponding to one or more characteristics of traffic of the network over a second time period, that the file has been exfiltrated from the network.

In some embodiments of the method, the one or more characteristics of traffic of the network over a second time period comprise one or more of: a throughput characteristic, a flow characteristic, and a deep packet inspection characteristic.

In some embodiments, a non-transitory computer-readable storage medium is provided, the non-transitory computer-readable storage medium storing one or more programs configured to be executed by one or more processors of a device with one or more processors and memory, the one or more programs including instructions for: determining a data size for a file in accordance with one or more characteristics of traffic of a computer network associated with the system; and storing a file having the determined data size on a storage medium of the system, wherein the file comprises one or more indicators that the file includes sensitive data that is not included in the file.

In some embodiments of the non-transitory computer-readable storage medium, the one or more characteristics of the traffic are characteristics monitored over a first period of time.

In some embodiments of the non-transitory computer-readable storage medium, determining the data size comprises: transmitting, to a remote computer, first network traffic data corresponding to the one or more characteristics of the traffic over a first time period; and receiving, from the remote computer, one or more parameters calculated in accordance with the first network traffic data, wherein the one or more parameters indicate the data size.

In some embodiments of the non-transitory computer-readable storage medium, storing the file having the determined data size comprises storing inflation data in the file, wherein: an amount of inflation data is determined in accordance with one or more parameters; and the inflation data is randomly generated or pseudo-randomly generated data.

In some embodiments of the non-transitory computer-readable storage medium, storing inflation data in the file comprises removing reference to the inflation data from an index of the file.

In some embodiments of the non-transitory computer-readable storage medium, storing the file comprises modifying a legitimate file to remove the sensitive data.

In some embodiments of the non-transitory computer-readable storage medium, storing the file comprises algorithmically generating a file based on portions of one or more legitimate files.

In some embodiments of the non-transitory computer-readable storage medium, the sensitive data comprises one or more selected from the group of: usernames, passwords, personal user information, encryption keys, medical information, and financial information.

In some embodiments of the non-transitory computer-readable storage medium, the one or more indicators comprise content generated based on the content of genuine documents related to a subject matter of other documents stored on the storage medium.

In some embodiments of the non-transitory computer-readable storage medium, the data size is determined based on the one or more characteristics of network traffic such that exfiltrating a file of the data size will generate an alert via a network monitoring tool.

In some embodiments of the non-transitory computer-readable storage medium, the one or more programs include instructions for determining, based on second network traffic data corresponding to one or more characteristics of traffic of the network over a second time period, that the file has been exfiltrated from the network.

In some embodiments of the non-transitory computer-readable storage medium, the one or more characteristics of traffic of the network over a second time period comprise one or more of: a throughput characteristic, a flow characteristic, and a deep packet inspection characteristic.

DETAILED DESCRIPTION

As described above, there is a need for improved systems, methods, and techniques of providing network security, anomaly detection, and data loss prevention. Particularly, there is a need for improved methods of anomaly detection that account for non-malicious variations in network traffic characteristics in time. There is also a need for improved methods of anomaly detection that utilize the ability to proactively modify or create information stored on a system, rather than simply reactively monitor the system, in order to improve anomaly detection by making exfiltration attempts more conspicuous.

One solution to this need is to use ongoing, iterative, or continuous network traffic monitoring in order to define baseline network characteristics to which to compare monitored network characteristics to detect abnormalities/anomalies. By continuously modeling and re-modeling a monitored network, a more accurate characterization of the network may be achieved, such that non-malicious variations in network traffic characteristics are not falsely identified as potentially malicious anomalies.

Based on the continuous network traffic monitoring, files or other data may be stored on a system associated with the network in such a way that attempts to exfiltrate the files may be made particularly conspicuous and more likely to be detected by anomaly detection and network monitoring tools. By using continuously monitored network traffic data, a target file size may be algorithmically detected, such that exfiltration attempts of files of the calculated size (or larger) may be expected to trigger network monitoring tools (e.g., anomaly detection tools) in more than a predefined percentage of attempts. For example, network traffic data may be used to calculate a file size, and files having at least that file size may be created and stored on a system. The files may be "inflated" with arbitrary, randomly generated, or pseudo-randomly generated data in order to make the files uncompressible or difficult to compress, and the arbitrary and/or random data may be obfuscated by removing reference to the data from an index of the inflated file. Content may also be stored in the inflated file in order to make the file an enticing target for malicious actors, such as by including indicators of sensitivity or confidentiality, while the file may in fact not include any sensitive or confidential information. Subsequent monitoring of network traffic after creation of one or more inflated files may then be expected to reliably and efficiently generate alerts when attempts to exfiltrate an inflated file are made, as the file will be of a sufficient size such that a spike in network traffic attributable to the attempt to exfiltrate the file will be sufficient to trigger network-monitoring protections.

Accordingly, described herein are improved systems, methods, and techniques of providing network security, anomaly detection, and data loss prevention.

In the following description of the disclosure and embodiments, reference is made to the accompanying drawings in which are shown, by way of illustration, specific embodiments that can be practiced. It is to be understood that other embodiments and examples can be practiced, and changes can be made without departing from the scope of the disclosure.

In addition, it is also to be understood that the singular forms "a", "an", and "the" used in the following description are intended to include the plural forms as well, unless the context clearly indicates otherwise. It is also to be understood that the term "and/or", as used herein, refers to and encompasses any and all possible combinations of one or more of the associated listed items. It is further to be understood that the terms "includes", "including", "comprises", and/or "comprising", when used herein, specify the presence of stated features, integers, steps, operations, elements, components, and/or units but do not preclude the presence or addition of one or more other features, integers, steps, operations, elements, components, units, and/or groups thereof.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and, generally, conceived to be a self-consistent sequence of steps (instructions) leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It is convenient, at times, principally for reasons of common usage, to refer to these signals as bits, values, elements, symbols, characters, terms, numbers, or the like. Furthermore, it is also convenient, at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that, throughout the description, discussions utilizing terms, such as "processing", "computing", "calculating", "determining", "displaying", or the like, refer to the action and processes of a computer system, or similar electronic computing device, that manipulates and transforms data represented as physical (electronic) quantities within the computer system memories or registers or other such information storage, transmission, or display devices.

Certain aspects of the present disclosure include process steps and instructions described herein in the form of an algorithm. It should be noted that the process steps and instructions of the present disclosure could be embodied in software, firmware, or hardware, and, when embodied in software, could be downloaded to reside on and be operated from different platforms used by a variety of operating systems.

The present disclosure also relates to a device for performing the operations herein. This device may be specially constructed for the required purposes, or it may comprise a general-purpose computer selectively activated or reconfigured by a computer program stored in the computer. Such a computer program may be stored in a non-transitory computer readable storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, with each coupled to a computer system bus. Furthermore, the computers referred to in the specification may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present disclosure is not described with reference to any particular programming language. It will be appreciated that a variety of programming languages may be used to implement the teachings of the present disclosure as described herein.

Systems for Network Security, Data Loss Prevention, and Anomaly Detection

A system for providing network security, data loss prevention, and anomaly detection is described below. The system may include one or more processors configured to monitor network traffic, generate a model of network traffic, create and store inflated files based on the model of network traffic, and monitor and detect attempts to exfiltrate inflated files.

Figure 1:
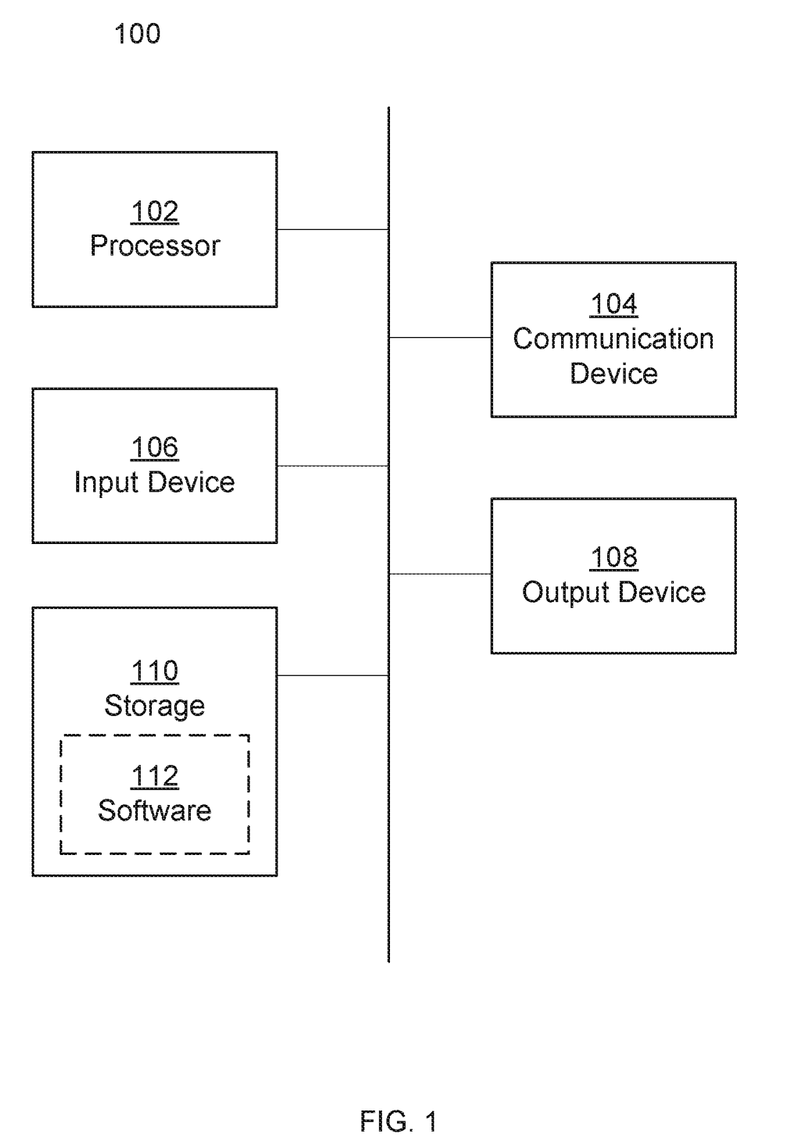
FIG. 1 shows an illustration of a computer system, in accordance with some embodiments.

An example of a computer system for allocating memory, according to some embodiments, is illustrated by system 100 in FIG. 1. As shown in FIG. 1, system 100 can be any suitable type of microprocessor-based device, such as a personal computer, workstation, server, handheld computing device, such as a phone or tablet, or distributed computing system (e.g., cloud computing system). The system can include, for example, one or more of processor 102, communication device 104, input device 106, output device 108, storage 110, and/or software 112 stored on storage 110 and executable by processor 102. The components of the computer can be connected in any suitable manner, such as via one or more physical buses or wirelessly.

In some embodiments, system 100 may include server-side computing components as well as client-side computing components. The specific elements shown in FIG. 1 may in some embodiments be included in a server-side computer and/or may, in some embodiments, be included in a client-side computer. In some embodiments, system 100 may include server-side components and client-side components that are in communication with one another via one or more instances of communication device 104, which may, for example, enable communication of server-side components and client-side components over a network connection.

In some embodiments, some or all components of system 100 may be part of a distributed computing system (e.g., a cloud computing system). In some embodiments of the techniques disclosed herein, for example, storage 110 may be storage provisioned by a cloud computing system, such that a user may send instructions to the cloud computing system over one or more network connections, and the cloud computing system may execute the instructions in order to leverage the cloud computing components in accordance with the instructions. In some embodiments, cloud computing systems may be configured to be capable of executing the same or similar program code in the same programming languages as other systems (e.g., servers, personal computers, laptops, etc.), as discussed herein.

Processor 102 may be any suitable type of computer processor capable of communicating with the other components of system 100 in order to execute computer-readable instructions and to cause system 100 to carry out actions in accordance with the instructions. For example, processor 100 may access a computer program (e.g., software 112) that may be stored on storage 110 and execute the program to cause the system to perform various actions in accordance with the program. In some embodiments, a computer program or other instructions executed by processor 102 may be stored on any transitory or non-transitory computer-readable storage medium readable by processor 102.

Communication device 104 may include any suitable device capable of transmitting and receiving signals over a network, such as a network interface chip or card. System 100 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Input device 106 may be any suitable device that provides input, such as a touch screen or monitor, keyboard, mouse, button or key or other actuatable input mechanism, microphone and/or voice-recognition device, gyroscope, camera, or IR sensor. Output device 108 may be any suitable device that provides output, such as a touch screen, monitor, printer, disk drive, light, speaker, or haptic output device.

Storage 110 can be any suitable device the provides storage, such as an electrical, magnetic or optical memory including a RAM, cache, hard drive, CD-ROM drive, tape drive, or removable storage disk.

Software 112, which may be stored in storage 110 and executed by processor 102, may include, for example, the programming that embodies the functionality of the methods, techniques, and other aspects of the present disclosure (e.g., as embodied in the computers, servers, and devices as described above). In some embodiments, software 112 may include a combination of servers such as application servers and database servers.

Software 112 can also be stored and/or transported within any computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 1040, that can contain or store programming for use by or in connection with an instruction execution system, apparatus, or device.

Software 112 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport readable medium can include, but is not limited to, an electronic, magnetic, optical, electromagnetic or infrared wired or wireless propagation medium.

System 100 can implement any one or more operating systems suitable for operating on the network. Software 112 can be written in any one or more suitable programming languages, such as C, C++, Java, or Python. In various embodiments, application software embodying the functionality of the present disclosure can be deployed in different configurations, such as in a client/server arrangement or through a Web browser as a Web-based application or Web service, for example.

Anomaly Detection Using Iteratively Updated Network Traffic Model and Inflated Files In some embodiments, anomaly detection may be made more dependable and more reliable by continuously updating a model of network traffic and using the updated model to (a) determine whether activity levels or other characteristics constitute an anomaly and (b) continuously modify the size of inflated files (e.g., "honey files") stored in the system and intended to be large enough in size to reliably cause an anomaly to be detected if exfiltration of an inflated file is detected. As described below, a network traffic model may be calculated using one or more algorithms analyzing flow data in a sliding window, such that the network traffic model always reflects recent network characteristics. As described below, inflated files may include an amount of arbitrary and/or random inflation data that is calculated based on the network traffic model, so as to optimize alert rates. Furthermore, data included in inflated files may be removed from a registry of the inflated file, such that the file does not appear to be large in size. The techniques described herein may allow for anomaly detection wherein alert rates are optimized due to the presence of inflated files, such that a large percentage of legitimate malicious intrusions and exfiltration attempts are detected while a small percentage of anomaly alerts are false-positive alerts.

Figure 2A:
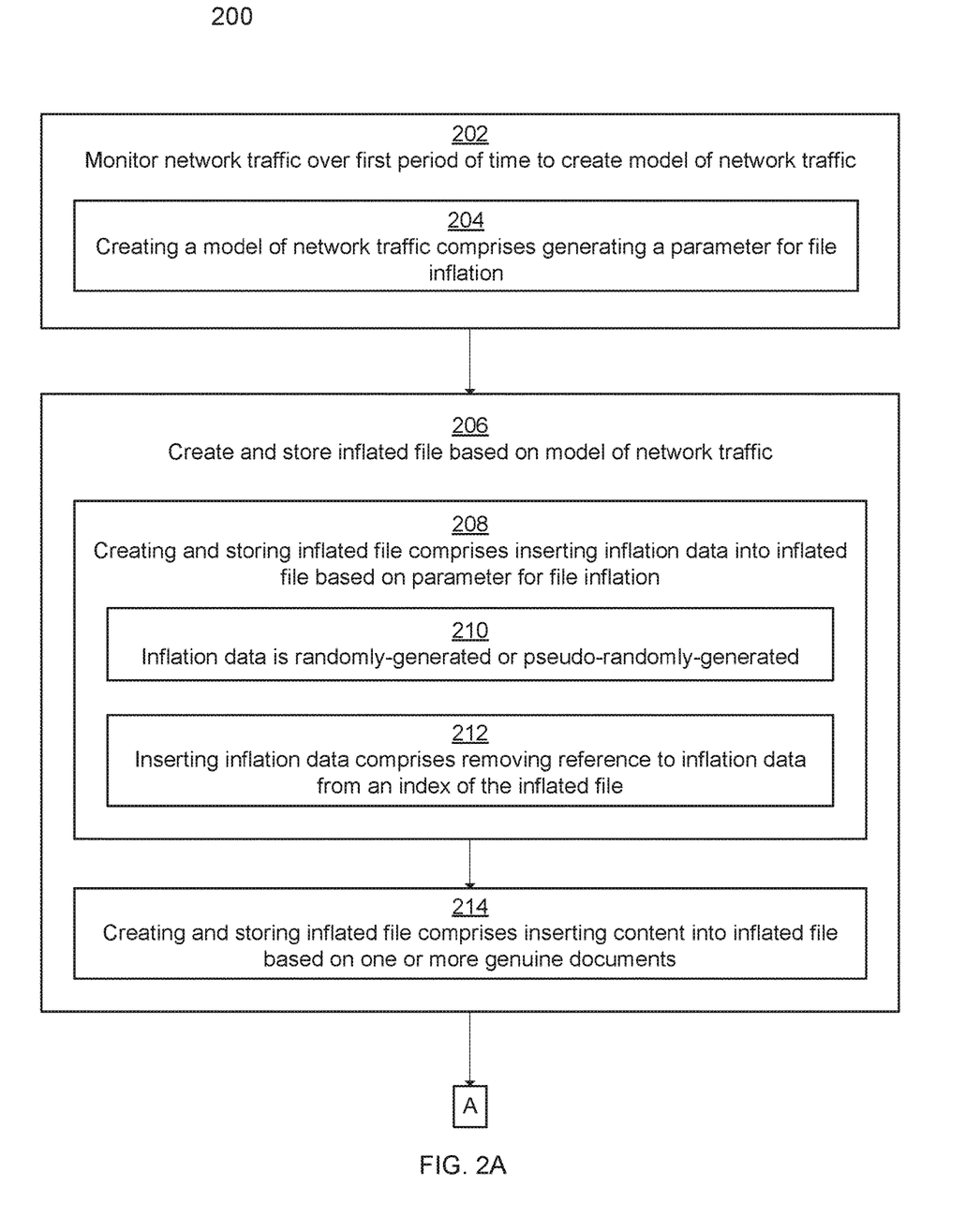
FIGS. 2A-2B show a flow chart depicting a method for anomaly detection, in accordance with some embodiments.
Figure 2B:
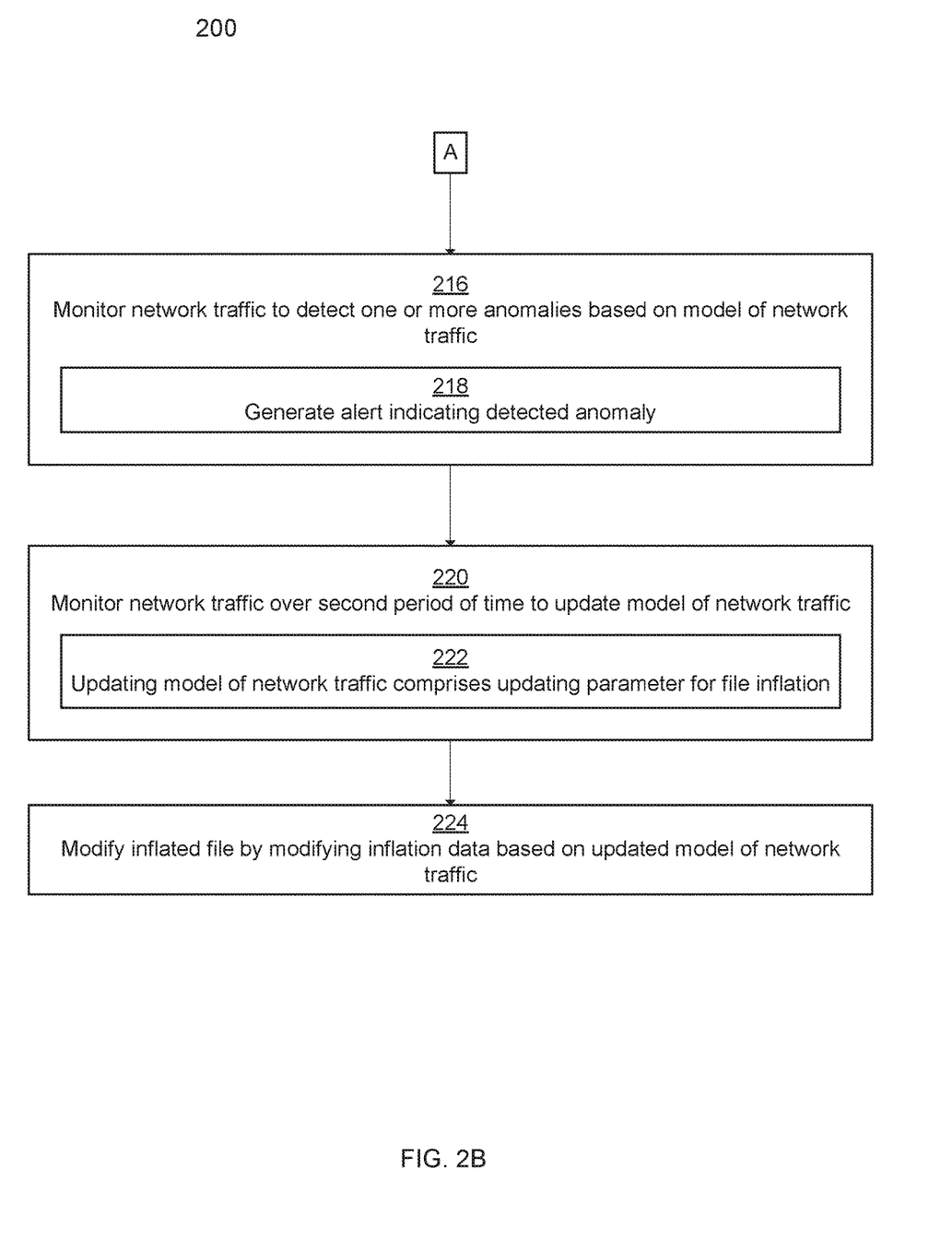

FIGS. 2A and 2B depict exemplary method 200 of anomaly detection in accordance with some embodiments. The method depicted in FIGS. 2A and 2B may be implemented by a computer system such as system 100 in FIG. 1 described above. Method 200 may, in some embodiments, be combined, in whole or in part, with other techniques described herein.

At block 202, in some embodiments, the system monitors network traffic over a first period of time to create a model of the network traffic. In some embodiments, the system may receive data reflecting traffic of the computer network to be monitored and modeled and may apply one or more algorithms to the data received in order to generate a model of the traffic. Data reflecting network traffic may be received over any communication device, such as communication device 104. In some embodiments, the model of the network traffic may reflect one or more characteristics of the network traffic, including, but not limited to, the overall volume of data transmitted over the network.

In some embodiments, the monitored network traffic may be limited to outbound network traffic, while, in some embodiments, the monitored network traffic may include internal network traffic as well. In embodiments in which only outbound network traffic is monitored, the traffic may be monitored via a gateway or switch that separates the monitored (internal) network from one or more wider networks such as the internet.

In some embodiments, monitoring the network traffic may include performing deep packet inspection. In some embodiments, monitoring the network traffic may include receiving and analyzing flow data without performing deep packet inspection. In some embodiments, flow data received and analyzed by the system may include flow data provided in any suitable format. Flow data may, in some embodiments, be provided by a router or by other network components. For example, the flow data may be data provided by Cisco NetFlow or by any one or more set of network monitoring tools facilitating the collection of flow data.

In some embodiments, analyzing flow data as opposed to performing deep packet inspection may be advantageous in generating a model of the network traffic, because analyzing flow data may be less resource-intensive than performing deep packet inspection. For example, flow data reflecting network traffic over a given duration may be able to be compressed and stored using substantially less storage space than would be required to store full packet capture data reflecting the same network traffic over the same duration of time. In some embodiments, analyzing flow data in generating a model of the network traffic may be advantageous, because it may avoid problems sometimes associated with dealing with encrypted data, because flow data may not be encrypted despite payload data being encrypted.

In some embodiments, monitoring network traffic may comprise monitoring network traffic over a predefined period of time or for a predefined span of time. For example, network traffic may be monitored for 15 minutes, 1 hour, 6 hours, 12 hours, one day, or one week. In some such embodiments, the model of the network traffic may be a model of network traffic over the time that was monitored. Network characteristics may be averaged over the monitored time-period, for example. In some embodiments, more recent time periods may be weighted more heavily in creating the model of network traffic, while time periods further in the past may be given less weight in the model.

As will be discussed in greater detail below, the network traffic model may, in some embodiments, be iteratively updated over time, such as every 15 minutes, every hour, every 6 hours, every 12 hours, every day, or every week. By iteratively, repeatedly, or continuously updating the network traffic model, the system may offer improvements over systems that simply collect data once to define a normal or baseline expectation for network traffic. Updating a model of network traffic over time may help to account for natural variations in network traffic characteristics in time and may, therefore, improve the reliability and accuracy of anomaly detection, such that normal traffic variations will not be mistaken for potentially malicious anomalies, and such that potentially malicious anomalies will not be mistaken for normal traffic.

In some embodiments, the model may take into account a span of time equal to the period at which the model is iteratively updated, such that the model over time would constitute adjacent windows of monitoring periods—for example, a modeling system may consider the most recent one-day period and may be updated once per day. In some other embodiments, the model may take into account a span of time that is greater than the period at which the model is iteratively updated, such that the model over time would constitute a sliding window of monitoring—for example, a sliding-window modeling system may consider the most recent one-day period but may be updated every five minutes.

At block 204, in some embodiments, creating a model of network traffic comprises generating a parameter for file inflation. For example, one or more algorithms may accept received flow data as input and may process the data to create a parameter (e.g., a numeric value) that may be applied by the system in order to perform file inflation (as will be discussed further below). In some embodiments, file inflation may include adding data to one or more files stored on a network in order to make the files more likely to be detected by network monitoring tools, if the files are exfiltrated. Since anomaly detection systems may monitor network activity for spikes in network traffic, or may otherwise be sensitive to transmitting large amounts of data, exfiltrating larger files may be inherently more likely to be detected by network monitoring tools and to generate alerts. Thus, increasing the size of a file stored in a system (which may be called inflating the file) may make attempts to exfiltrate all or part of the file more likely to be detected by network monitoring tools.

However, while inflating files in a system may make it more likely that exfiltration attempts are detected, the increased storage space and processing demands for storing and handling large files may be an inherent trade-off of maintaining inflated files. Accordingly, it may be desirable for inflated files to be large enough to reliably trigger anomaly detection systems and other network monitoring tools, while not being arbitrarily large and introducing undue storage and computational demands on a system. In order to address this issue, it may be desirable for one or more files to be inflated to varying degrees depending on background levels of network activity. That is, if there is more network activity (e.g., greater rate of information transmitted), then file inflation may have to be more extreme than if there is less network activity. Moreover, as network characteristics change over time in accordance with seasonal, weekly, daily, or hourly usage patterns, the optimal degree of file inflation may change.

In some embodiments, file inflation that addresses the issues above—including achieving an optimal degree of file inflation at different times—may be achieved by applying one or more file inflation parameters that govern a degree of file inflation. A file inflation parameter may be a discrete value, such as a numerical value, that may be used to determine the degree to which one or more files should be inflated. For example, a file inflation parameter may be a scalar value (e.g., a multiple by which a file size should be increased by inflation), an absolute value in storage size (e.g., a number of bytes by which a file size should be increased), or another suitable value. In some embodiments, a file inflation parameter may comprise rules or logic that govern how it should be applied to one or more file types, one or more specific files, or one or more different systems in order to cause file inflation, such as if the network monitoring indicates that a certain type of file should be inflated to a greater degree than another type of file.

In some embodiments, calculation of a file inflation parameter may depend on one or more user-adjustable inputs. For example, in some embodiments, a client may indicate a number or rate of anomaly alerts that it is equipped or willing to address (e.g., 10 per day, 100 per day, 100 per week, etc.), and the algorithm used to calculate the inflation parameter may account for this number or rate in order to create an inflation parameter configured to and expected to, based on network traffic characteristics, generate approximately or no more than approximately the target number or rate of alerts.

As explained above, changes in levels of network activity over time may create the need for iteratively updating the network traffic model and the included inflation parameter. In some embodiments, the network parameter may be updated iteratively in accordance with a sliding-window system or with an adjacent-window system. In adjacent window systems, the value of the inflation parameter may be updated in accordance with only new data available from the last time that the value was updated, and no older data. In sliding window systems, the value of the inflation parameter may be updated with the latest data available since the last time the parameter was updated, while some older data may still be considered. For example, the most recent five minutes may be accounted for in the latest iteration, while data that is between 24 hours and 24-hours-and-five-minutes old may be dropped from consideration in a sliding window system.

In some embodiments, the inflation parameter may be stored by the system once it is calculated. For example, system 100 may store the inflation parameter on storage 106. In some embodiments, the inflation parameter may be transmitted to another system component, or to outside the system, such as being transmitted to or from a server or client. For example, system 100 may transmit the inflation parameter via communication device 104. In some embodiments, the inflation parameter may be stored and/or transmitted iteratively each time that it is calculated.

In some embodiments, modeling network traffic may include processing the received flow data by one or more algorithms, which may simulate an attack on a given set of files. The algorithm may simulate attempts by a malicious actor to randomly exfiltrate a set number of files, with some of the files being genuine files and some being inflated files (or other forms of decoy files, honey files, etc.). The algorithm may simulate one or more files in the set as being inflated to a set size (e.g., a predefined number of bytes). If the simulated exfiltration attempt triggers an exfiltration detection tool based on a given set of historical traffic data and one or more predefined thresholds, then the simulation may end. Iterative simulations using different data sizes for files may calculate a normalized attacker payoff based on a number of genuine files exfiltrated before exfiltration detection tools or other network monitoring tools generate an alarm to end the simulation. The iterative simulations may thus explore the effects of increasing the number of inflated files and/or the inflation size. The parameters associated with the simulation with the least attacker payoff may be used to update a framework and/or to send updated information to a client to be used to inflate files on the protected system.

In some embodiments, information generated in accordance with the network traffic model may include, in place of or in addition to information pertaining to a file size to be used for inflating files, information pertaining to a number or a density of inflated files. For example, the inflation parameter and/or other information provided to a client or otherwise generated in accordance with the network traffic model may include information governing or instructing how many inflated files should be created or how many inflated files should be created in relation to a number of genuine files.

At block 206, in some embodiments, the system creates and stores an inflated file based on the model of network traffic. The inflated file may in some embodiments be considered a "honey file" that is designed to be a target for malicious actors or system intruders. In some embodiments, the inflated file may be stored in any storage medium of the system, including in locations at which legitimate files are stored. By storing inflated files alongside legitimate files, a system may deceive intruders and malicious actors as to whether any particular file is a legitimate file or an inflated file. In the example of system 100, inflated files may be stored on storage 110.

In some embodiments, the system may create a new file for inflation as a honey file, such that intruders or malicious actors are forced to choose between real files and honey files when attempting to exfiltrate information. In some other embodiments, the inflation techniques disclosed herein may be applied to existing genuine files, such that inflation data included in a genuine file may still improve anomaly detection even if a malicious actor or intruder is successful in exfiltrating the genuine file.

The inflated file may, in some embodiments, be any file type that is otherwise present on the system or may be any file type that is otherwise not present on the system. In some embodiments, the inflated file may be a word processing or text document such as a Microsoft Word document, may be a PDF document, may be a Microsoft Office document or other document related to email communications, may be a database file, such as an Oracle database file, may be any XML file, may be any OOXML file, or may be any other file type, particularly file types that have been demonstrated to be of potential interest to malicious actors and system intruders.

In embodiments in which the system generated a parameter for file inflation as discussed with respect to block 204, the system may create and store an inflated file based on the parameter for file inflation. The size of the inflated file may be determined in accordance with the model and/or with the parameter. For example, if the parameter is a scaling parameter, then the file may be inflated to a multiple of a base size, wherein the base size may be a preexisting file size, a size of one or more files already present in the system, a size of a legitimate file that has been copies and/or otherwise modified, or a size of a file type without any additional or added information (e.g., a size of a blank Microsoft Word document file). If the parameter is an absolute value, then the size of the inflated file may be set to be equal to a predetermined value or may be increased by a predetermined value without regard for the file's (or any other file's) initial size.

At block 208, in some embodiments, creating and storing the inflated file may comprise inserting inflation data into the inflated file based on the parameter for file inflation. Inflation data may be any data that is added to or included in a file in order to achieve the desired inflated file size, as discussed above. In some embodiments, where the inflated file is a copy of a legitimate file, inflation data may be added in to the already existing copy; in some embodiments, where the inflated file is created from scratch, the inflated file may be created in any acceptable file format, and inflation data may then be added.

At block 210, in some embodiments, the inflation data may be randomly generated or pseudo-randomly generated. In some embodiments, inflation data may be arbitrary data, may be non-secure or non-sensitive data, may be copied or repeated data, and/or may be randomly generated or pseudo-randomly generated data. In some embodiments, using randomly generated or pseudo-randomly generated data as inflation data may be advantageous, because the inflation data may be minimally compressible or entirely uncompressible. If the inflation data is minimally compressible or entirely uncompressible, then malicious actors or system intruders may be unable to compress the files in order to conceal exfiltration attempts from network monitoring and anomaly detection tools.

At block 212, in some embodiments, inserting the inflation data may include removing reference to the inflation data from an index of the inflated file. For example, the inflation data may be inserted into a file as a distinct object (e.g., a distinct XML object) from other file data, and then reference to the object may be deleted from an index of the file, such that the inflation data will no longer be indexed in the file. Deleting reference to the inflation data from an index of the file may be advantageous, because it may conceal the presence of the inflation data from a malicious actor, such that the malicious actor may not know that the file size is inflated and that attempted exfiltration of the file may trigger network monitoring tools. Furthermore, deleting reference to the inflation data from an index of the file may circumvent limitations on file size; for example, Windows may prohibit Microsoft Word files from exceeding a certain total size, but deleting reference to inflation data from a reference of a Word file may allow the total file size to exceed the otherwise applicable limitation.

At block 214, in some embodiments, creating and storing the inflated file may comprise inserting content into the inflated file based on one or more legitimate documents. Inserting content taken from or based on legitimate files may be useful in making the inflated file appear to be a real file and in making it an enticing target for attempted exfiltration by malicious actors. In some embodiments, content copied directly from a legitimate file may be inserted into the inflated file to make the inflated file appear to be a legitimate file. In some embodiments, content based on legitimate files may be inserted into an inflated file in order to attempt to make the inflated file appear to be a file having sensitive or secret information. For example, a system may insert text or other data indicating an inflated file as "confidential" or "secret", even if the inflated file is not.

In some embodiments, a system may determine words, phrases, sentence structures, document structures, numbers, symbols, and/or images that are indicative of legitimate files and/or sensitive/secret files and may replicate those characteristics in content inserted into an inflated file. Such characteristics may, in some embodiments, be extracted from a corpus of one or more documents provided by a user of a system. For example, a user of a system may provide a large corpus of dozens or hundreds or thousands of non-confidential documents (e.g., white papers, recently published articles, recently declassified document, news articles, manuals, etc.) to the system, wherein the documents all relate to a subject matter of legitimate files located on the system and/or to a subject matter of potential or suspected interest to malicious actors. The system may then scan and analyze the corpus of documents in order to extract one or more of the characteristics recited above and may then insert those characteristics into an inflated file. In some embodiments, the system may generate an entire document's content (e.g., text and figures and numbers) based on the extracted content, while, in some embodiments, the system may start with a template and replace portions of the template or otherwise modify the template based on the characteristics extracted from the corpus of documents. In some embodiments, the template may be an artificial template, while, in some embodiments, the template may be a legitimate document (e.g., one document from the corpus) that the system modifies based on characteristics from other legitimate documents.

By inserting content into inflated files based on a corpus of legitimate documents relating to relevant subject matter, the inflated files may be made to appear to be of high value to malicious actors and network intruders, particularly to malicious actors who are not technically skilled in the subject matter or who are leveraging automated tools to scan for keywords or phrases or the like. By making the inflated files more enticing or more likely to be selected by automated systems searching for keywords or phrases, the likelihood of an attempted extraction of an inflated file may be increased, and the likelihood of network monitoring tools detecting the presence of a malicious actor may accordingly be increased.

These techniques may, in some embodiments, take advantage of malicious actors or intruders who search for exfiltration targets in a shallow manner, such as by using keyword searching, doing cursory manual reviews of document content for apparent subject-matter relevance, or by simply copying all available files. In some cases, malicious actors may inadvertently copy an inflated file when it is made to appear to be a genuine document, thereby triggering anomaly detection tools as disclosed herein. Even in cases where a malicious actor successfully avoids attempting to exfiltrate an inflated file, the malicious actor may still be forced to expend time and effort to differentiate genuine files from honey files or to otherwise determine how to avoid exfiltrating inflated files. Attempts by malicious actors to manually examine documents for file size or for content may also cause the malicious actor to inadvertently reveal himself before exfiltration is attempted.

In some embodiments, steganographically encoded information containing log data, such as IP addresses contacted and a time of extraction, may further be stored in the inflated file. In some embodiments, steganographically encoded information may be used to watermark an inflated file such that the watermark information may be used to prove that a file was exfiltrated; this traceability may devalue exfiltrated information or increase the risk of exposure of malicious actors, acting as a potential deterrent. In some embodiments, steganographically encoded information may include code including instructions to contact the server from which an inflated file was exfiltrated (e.g., a "phone home" feature) such that the location to which the file was exfiltrated may be discovered. Furthermore, in some embodiments, steganographically encoded information may be used to inflate a file without damaging or otherwise altering its functionality, for example by inflating a zip file such that an unzip utility may not unzip steganographically encoded inflation data.

At block 216, in some embodiments, after creating and storing the inflated file, the system may monitor network traffic to detect one or more anomalies based on the model of network traffic. The system may monitor the network traffic after creating and storing one or more inflated files on the system, wherein the monitoring is performed in a same or similar manner as discussed above with respect to the network monitoring at block 202. In some embodiments, network monitoring may be carried out based on the same or similar type of data provided from the network for the monitoring discussed above with respect to block 202, such as flow data. In some embodiments, the monitoring at block 216 may take place over a time span occurring after the monitoring at block 202, such that the network traffic model generated in accordance with the monitoring at block 202 may be compared to the network characteristics observed during the monitoring at block 216. In some embodiments, if the system detects a spike or increase or other pattern of network activity that does not conform to the network traffic model, then the system may determine that an anomaly has occurred. In some embodiments, the system may define one or more predefined or user-adjustable thresholds for one or more network characteristics (e.g., volume of traffic, etc.) based on the model, and, if the one or more characteristics of the network exceed the defined one or more thresholds, then the system may indicate that an anomaly has occurred.

In some embodiments, the one or more thresholds may be defined based on the model of the network such conventional and legitimate network traffic will not cause the one or more thresholds to be exceeded or for an anomaly to otherwise be detected. However, the thresholds may be set, and the monitoring may be carried out such that it can be expected that attempted exfiltration of one or more inflated files may cause an anomaly to be detected, due, at least, in part to the inflated size and/or uncompressible nature of the inflated filed.

At block 218, in some embodiments, the system may generate an alert indicating a detected anomaly. In addition or alternately to generating an alert, various other actions may be taken in response to an anomaly being detected, such as recording and storing information about the anomaly, changing one or more settings of the system, or changing one or more permissions in the system.

At block 220, the system may monitor network traffic over a second period of time to update the model of network traffic. As discussed above, monitoring network traffic over a second period of time may comprise using a sliding window system or an adjacent window system to monitor network traffic over time. In some embodiments, monitoring network traffic over the second period of time may be carried out in a same or similar manner as monitoring network traffic over the first period of time as discussed above with reference to block 202. In some embodiments, modifying the model of network traffic may comprise modifying or replacing stored data relating to the model of the network traffic, and/or it may comprise transmitting data regarding modifications or replacements to be made to stored data regarding the model of the network traffic.

At block 222, in some embodiments, updating the model of network traffic may comprise updating the parameter for file inflation. Updating the parameter for file inflation may comprise modifying or replacing stored data relating to the parameter for file inflation, and/or it may comprise transmitting data regarding modifications or replacements to be made to stored data regarding the parameter for file inflation.

At block 224, in some embodiments, after modifying the model of network traffic (possibly including updating the parameter for file inflation), the system may modify the inflated file by modifying inflation data based on the updated model of network traffic. In some embodiments, modifying the inflated file may comprise replacing some or all of the data constituting the file, and it may include replacing the file with a new file entirely. In some embodiments, modifying the inflation data may include replacing the inflation data in whole or in part, adding to the inflation data, or removing or deleting some or all of the inflation data. In some embodiments, inflation data may be regenerated when the inflation file is modified, while in some embodiments some inflation data may persist during and after a modification of the inflation file. In some embodiments, modifying the inflation file may include modifying data in the inflation file aside from the inflation data, such as modifying human-readable text content of the inflation file. The modifications made to the inflation file may be made according to the same or similar algorithms, considerations, and calculations discussed above with respect to creating and storing the inflation file at blocks 206-214. As discussed above, the inflation file may be configured such that its size is large enough to be expected to reliably trigger network monitoring tools if attempts are made to exfiltrate the inflated file.

In some embodiments, monitoring network traffic may continue to be carried out over time following the second time period, and the process of monitoring network traffic, updating the model of network traffic, updating the parameter for file inflation, and modifying the inflated file may be iteratively repeated according to a predefined schedule or timing scheme.

In some embodiments of method 200, monitoring network traffic may be carried out by a system having server-side components and client-side components. For example, the protected components of the system and the monitored network may exist on the client-side of a system, and client-side components may transmit flow data and/or other information about the network to the server-side of the system. Server-side components may then analyze the information about the network traffic in order to generate the model of network traffic. Server-side component may then transmit some or all information regarding the model of the network traffic (e.g., the parameter for file inflation) back to the client-side components, where client-side components may create and store or modify inflated files. It may be advantageous to perform modeling and analysis on server-side components, because the task of modeling the network may be computationally intensive, and client-side systems may be incapable of carrying out the task, or it may be inefficient or impractical for them to do so. Conversely, it may be advantageous for creation, maintenance, and modification of inflated files to be carried out by client-side components, because it may be inefficient or impractical for inflated files themselves (which may be very large by intentional design) to be transmitted from server-side components to the protected client-side components of the system where the inflated files must ultimately be stored. In some embodiments, monitoring of network traffic, once inflated files are generated and stored, to detect anomalies may be carried out by client-side components, server-side components, or both. In accordance with the description provided herein, other arrangements and distributions of system components and method steps described herein may be implemented.

One example of a system architecture that may be used to implement some or all of the steps discussed above is shown in FIG. 3, which shows an exemplary system architecture in some embodiments. System 300 may comprise internal network 302, which may be a protected network that is part of a client-side system, as discussed above. Internal network 302 may, for example, be a private network that may leverage the techniques disclosed herein to detect attempts to exfiltrate data from internal network 302 to external network 310. External network 310, which may be connected to internal network 310 via switch 308, may be any network outside the protected internal network 302, such as the internet.

Figure 3:
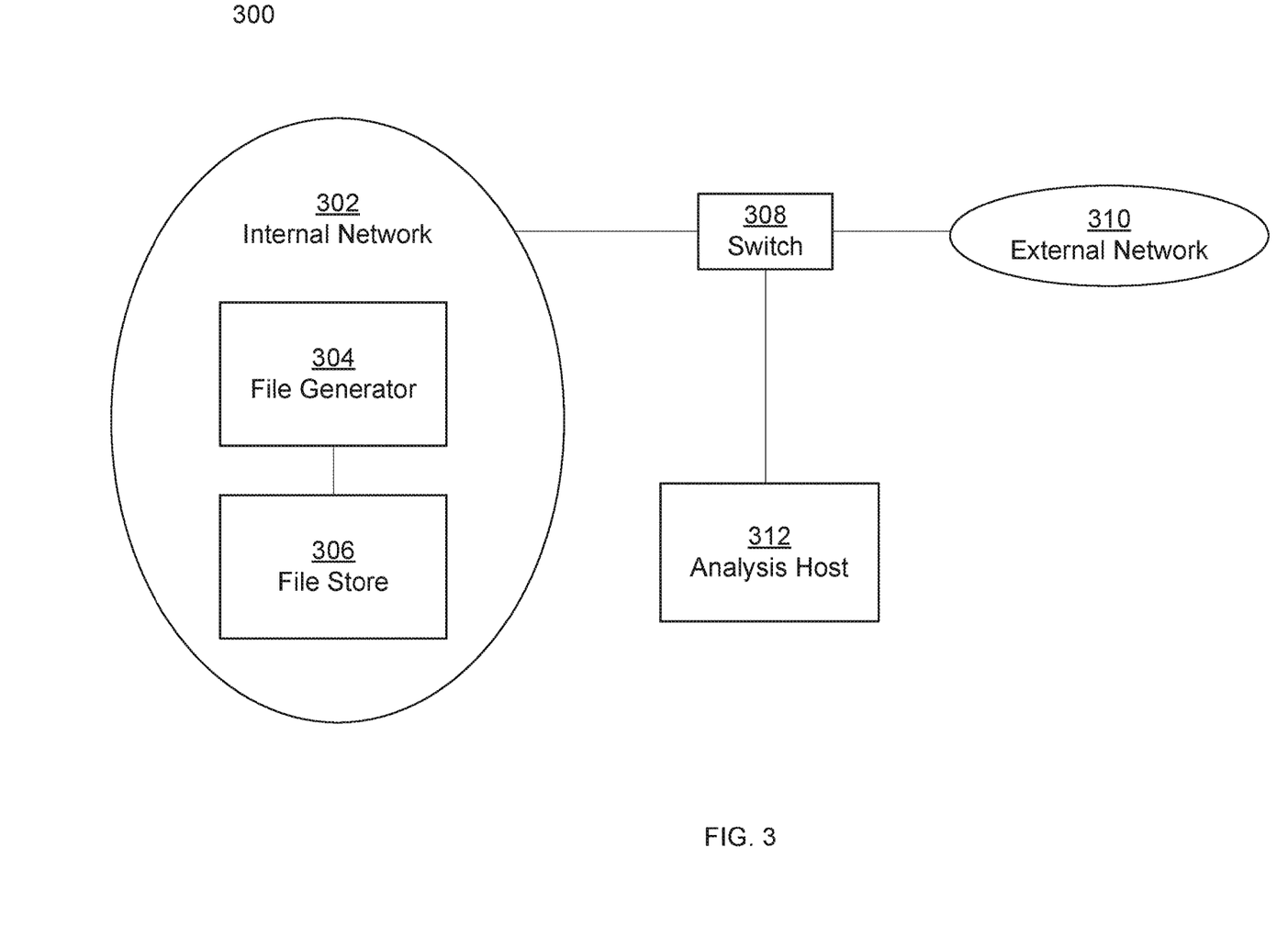
FIG. 3 shows an illustration of a computer system, in accordance with some embodiments.

Internal network 302 may comprise file generator 304, which may generate inflated files in accordance with the techniques disclosed herein. File generator 304 may be any server or computer (which may have some or all of the components of system 100 discussed above) in communication with file store 306, on which file generator 304 may store the inflated files. File store 306 may be any computer storage associated with internal network 302 and may have one or more characteristics in common with storage 110 discussed above with reference to FIG. 1.

System 300 may comprise analysis host 312, which may, in some embodiments, be located outside internal network 302, as shown. Analysis host 312 may be any server or computer, which may have some or all of the components of system 100 discussed above. Analysis host 312 may be part of a server-side system distinct from the client-side system. (In some embodiments, analysis host 312 may alternately be part of internal network 302 and/or may be part of the client-side system). In some embodiments, analysis host 312 may be any server or computer configured to receive network traffic data from switch 308, to analyze the data received in order to model the network traffic, and to send information to internal network 302 regarding the network traffic model and how to create inflated files. For example, in accordance with method 200 discussed above, analysis host 312 may receive flow data from switch 308 regarding outbound network traffic from internal network 302, may model the network traffic based on the flow data, and may send internal network 302 the inflation parameter to be used by file generator 304 to create and/or store inflated files on file store 306. Analysis host may also, in some embodiments, perform monitoring of network traffic following the creation of one or more inflated files in order to detect anomalies due to attempted exfiltration of the inflated files. Alternately or additionally, in some embodiments, monitoring for anomalies may be performed by a server, computer, or other component (not shown) of internal network 302 and/or or a client-side system.

The techniques, methods, systems, devices, and/or other aspects disclosed herein may, in some embodiments, optionally be combined with one another in any suitable combination.

What is claimed is:

1. A computer system for creating one or more files for data exfiltration detection comprising:
one or more processors; and
memory storing one or more programs configured to be executed by the one or more processors, the one or more programs including instructions for:
selecting a data size for a file to be stored on a storage medium of the system, wherein the selected data size is selected based on a volume of data transmitted over a computer network as indicated by a model of network traffic created based on one or more characteristics of traffic of the computer network associated with the system, wherein the volume of data transmitted comprises a volume of outbound network traffic data traversing an interface between the computer network and a wide network to which the computer network is connected; and
after selecting the selected data size and based on the selected data size, storing the file having the selected data size on the storage medium of the system, wherein the file comprises one or more indicators that the file includes sensitive data that is not included in the file.

2. The system of claim 1, wherein the one or more characteristics of the traffic are characteristics monitored over a first period of time.

3. The system of claim 1, wherein selecting the data size comprises:
transmitting, to a remote computer, first network traffic data corresponding to the one or more characteristics of the traffic over a first time period; and
receiving, from the remote computer, one or more parameters calculated in accordance with the first network traffic data, wherein the one or more parameters indicate the data size.

4. The system of claim 3, wherein the one or more parameters are generated as part of generating the model of network traffic.

5. The system of claim 1, wherein storing the file having the selected data size comprises storing inflation data in the file, wherein:
an amount of inflation data is set by the system in accordance with one or more parameters; and
the inflation data is randomly generated or pseudo-randomly generated data.

6. The system of claim 5, wherein storing inflation data in the file comprises removing a reference to the inflation data from an index of the file.

7. The system of claim 1, wherein storing the file comprises modifying a legitimate file to remove the sensitive data.

8. The system of claim 1, wherein storing the file comprises algorithmically generating the file based on portions of one or more legitimate files.

9. The system of claim 1, wherein the sensitive data comprises one or more selected from the group of: usernames, passwords, personal user information, encryption keys, medical information, and financial information.

10. The system of claim 1, wherein the one or more indicators comprise content generated based on the content of genuine documents related to a subject matter of other documents stored on the storage medium.

11. The system of claim 1, wherein the selected data size is selected based on the one or more characteristics of network traffic such that exfiltrating a file of the data size will generate an alert via a network-monitoring tool.

12. The system of claim 11, wherein the network-monitoring tool is a network traffic anomaly detection tool.

13. The system of claim 1, the one or more programs including instructions for determining, based on second network traffic data corresponding to one or more characteristics of traffic of the network over a second time period, that the file has been exfiltrated from the network.

14. The system of claim 13, wherein the one or more characteristics of traffic of the network over a second time period comprise one or more of: a throughput characteristic, a flow characteristic, and a deep packet inspection characteristic.

15. The system of claim 1, wherein the model of network traffic is generated based on monitoring flow data of the computer network and without performing deep packet inspection.

16. The system of claim 1, wherein the model of network traffic is generated and updated using a sliding window monitoring period.

17. The system of claim 1, wherein the selected data size is selected based on a user input indicating a permissible number of anomaly alerts to be generated when monitoring traffic of the computer network after storing the file having the selected data size.

18. A method for creating one or more files for data exfiltration detection, performed at a computer system comprising one or more processors and memory, the method comprising:

selecting a data size for a file to be stored on a storage medium of the system, wherein the selected data size is selected based on a volume of data transmitted over a computer network as indicated by a model of network traffic created based on one or more characteristics of traffic of the computer network associated with the system, wherein the volume of data transmitted comprises a volume of outbound network traffic data traversing an interface between the computer network and a wide network to which the computer network is connected; and after selecting the selected data size and based on the selected data size, storing the file having the selected data size on the storage medium of the system, wherein the file comprises one or more indicators that the file includes sensitive data that is not included in the file.

19. A non-transitory computer-readable storage medium storing one or more programs configured to be executed by one or more processors of a system with memory, the one or more programs including instructions for:

selecting a data size for a file to be stored on a storage medium of the system, wherein the selected data size is selected based a volume of data transmitted over a computer network as indicated by on a model of network traffic created based on one or more characteristics of traffic of the computer network associated with the system, and wherein the volume of data transmitted comprises a volume of outbound network traffic data traversing an interface between the computer network and a wide network to which the computer network is connected; and after selecting the selected data size and based on the selected data size, storing the file having the selected data size on the storage medium of the system, wherein the file comprises one or more indicators that the file includes sensitive data that is not included in the file.

* * * * *